United States Patent
Kumar

(10) Patent No.: US 7,138,773 B2
(45) Date of Patent: Nov. 21, 2006

(54) MULTIPLE INVERTERS FOR MOTORS

(75) Inventor: Ajith Kuttannair Kumar, Erie, PA (US)

(73) Assignee: General Electric Company, Schenectady, NY (US)

( * ) Notice: Subject to any disclaimer, the term of this patent is extended or adjusted under 35 U.S.C. 154(b) by 551 days.

(21) Appl. No.: 10/602,807

(22) Filed: Jun. 24, 2003

(65) Prior Publication Data
US 2004/0262057 A1    Dec. 30, 2004

(51) Int. Cl.
*H02R 7/10*    (2006.01)
(52) U.S. Cl. .............. 318/138; 318/801; 318/798; 318/799; 318/800
(58) Field of Classification Search .......... 318/138, 318/801, 798, 799, 800, 802, 140, 151; 363/71, 363/60
See application file for complete search history.

(56) References Cited

U.S. PATENT DOCUMENTS

| | | | |
|---|---|---|---|
| 3,638,098 A * | 1/1972 | Guggi | 363/137 |
| 4,292,531 A * | 9/1981 | Williamson | 290/14 |
| 4,549,258 A * | 10/1985 | Honbu et al. | 363/71 |
| 5,132,892 A | 7/1992 | Mizoguchi | |
| 5,168,437 A | 12/1992 | Gyugyi et al. | |
| 5,191,518 A | 3/1993 | Recker et al. | |
| 5,844,375 A | 12/1998 | Lin et al. | |
| 5,852,555 A | 12/1998 | Martin | |
| 5,862,041 A | 1/1999 | Martin | |
| 6,229,722 B1 | 5/2001 | Ichikawa et al. | |
| 6,392,905 B1 | 5/2002 | Huang et al. | |
| 2002/0104239 A1 | 8/2002 | Naruse et al. | |

FOREIGN PATENT DOCUMENTS

| | | |
|---|---|---|
| EP | 0 524 398 | 1/1993 |
| EP | 0 588 628 | 3/1994 |

* cited by examiner

*Primary Examiner*—Karen Masih
(74) *Attorney, Agent, or Firm*—Senniger Powers; Carlos Hanze

(57) ABSTRACT

A non-highway vehicle including an engine, a DC power source driven by the engine and providing DC power via a DC bus, a traction motor, a circuit for connection to the DC bus for providing power to the traction motor, and a controller. The circuit includes at least two inverters which share the power supplied to the traction motor. A first inverter connects between the DC bus and the traction motor and a second inverter connects between the DC bus and the traction motor. The second inverter is in parallel connection with the first inverter. The controller coordinates operation of the first and second inverters.

26 Claims, 16 Drawing Sheets

Current equalizing regulator option 2

FIG. 1A Prior Art
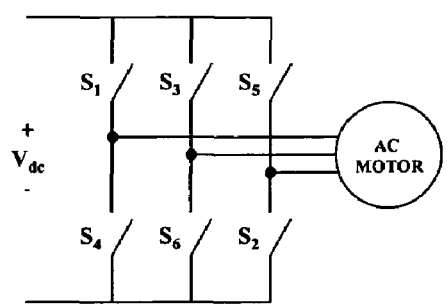
FIG. 1B Prior Art
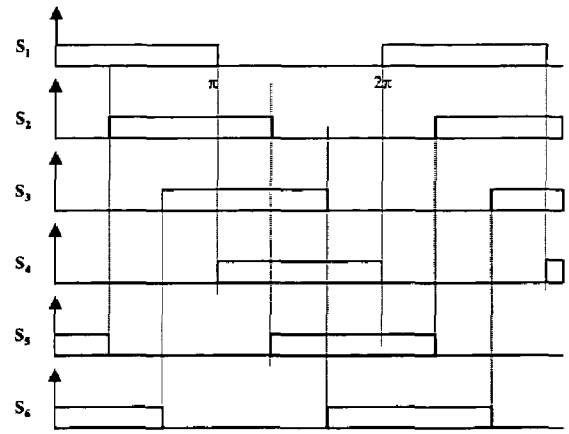
FIG. 1C Prior Art
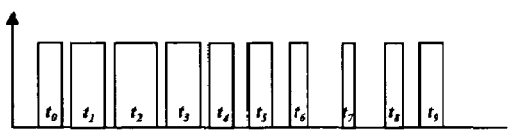
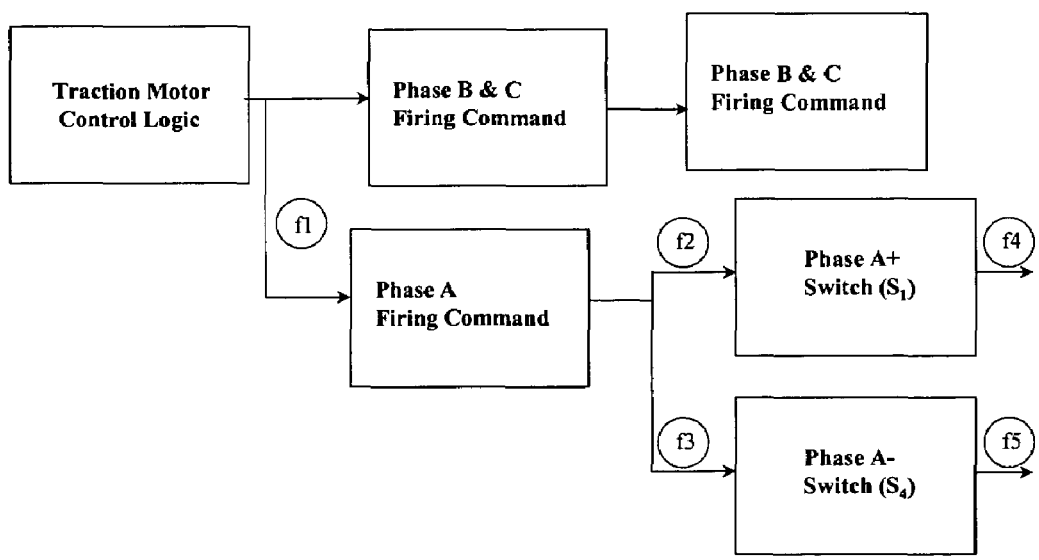
FIG. 2 Prior Art

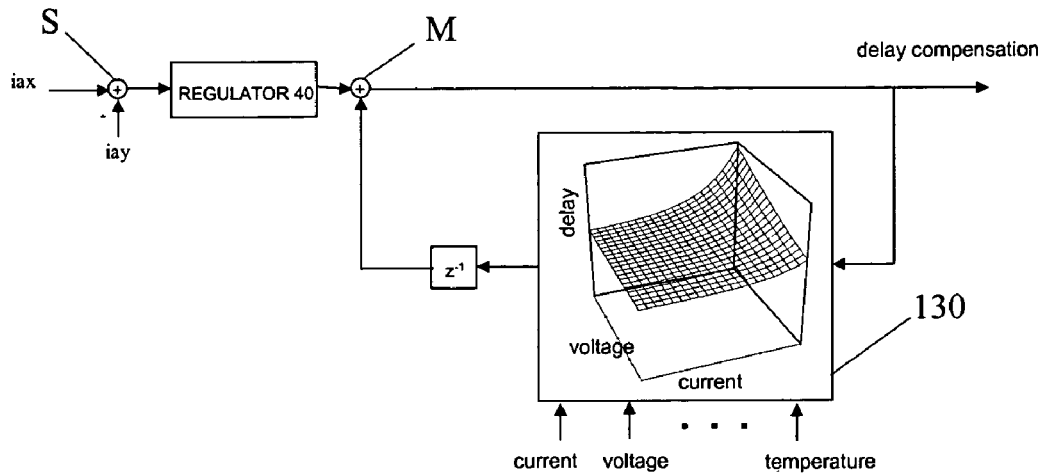
FIG. 13
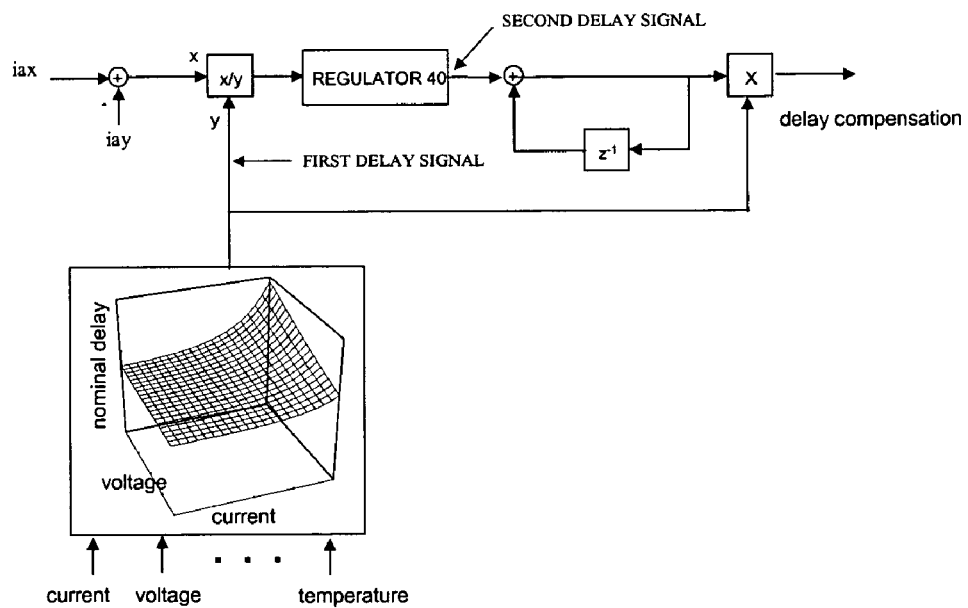
FIG. 14 Current equalizing regulator option 2

US 7,138,773 B2

1

MULTIPLE INVERTERS FOR MOTORS

BACKGROUND OF THE INVENTION

1. Field of the Invention

The invention relates to inverters for supplying power to motors and, in particular, to two or more balanced or matched inverters for supplying power to AC traction motors, particularly traction motors of non-highway vehicles.

2. Description of the Prior Art

Off highway vehicles with electric propulsion used for heavy duty are typically equipped with DC power source such as a diesel engine supplying power to an alternator. The output of the alternator is rectified to form a DC link which supplies power to a variable frequency, variable voltage inverter. The inverter drives a three phase induction motor connected to the rear wheels of the vehicle. As the requirements for haulage capability of such vehicles increases, a corresponding increase in the power required to propel such vehicles is needed. This in turn increases the power rating requirements of the semiconductors which provide the switching of the variable frequency, variable voltage inverter.

FIG. 1A illustrates a typical prior art three phase single inverter including a DC bus and six electronic switches which are selectively opened and closed to feed power to a three phase AC motor. The electronic switches S1–S6 consist typically of IGBT or GTO switches and their associated diode and snubber components.

FIG. 1B illustrates a prior art timing diagram of the individual commands for six step operation of the six switches S1–S6 illustrated in FIG. 1A. This timing diagram is referred to as an "ideal" timing diagram because the timing illustrated assumes instantaneous switching of the switches so that the switches transition from on to off or off to on instantaneous. As will be noted below with regard to the invention, in practice such switches have timing delays and such timing delays can be problematic if not controlled and/or compensated. In the square wave or six step operation illustrated in FIG. 1B, the six electronic switches S1–S6 are turned on every 60° in the proper order to produce a three phase balanced waveform. For example, when switch S1 is commanded ON, its IGBT is gated on ON and the current will flow through the IGBT or through its anti-parallel diode. If the current is positive (into the AC traction motor), then the IGBT of S1 will be conducting. If the current is negative (from the motor), then the anti-parallel diode connected to the IGBT of S1 will conduct. In either case, the switch S1 which is commanded will be conducted.

FIG. 1C illustrates prior art phase commands for pulse width modulated (PWM) operation of the inverter of FIG. 1A. PWM is used to vary the power supplied to the AC motor. During PWM operation, the six electronic switches S1–S6 are turned ON and OFF at a much higher switching frequency than the fundamental frequency of ON and OFF operation as illustrated in FIG. 1B. In FIG. 1C, the exemplary commands that may go to one of the switches is illustrated. The commands provided to its corresponding switch in the same phase would be opposite the commands illustrated in FIG. 1C, except for minimum ON/OFF and snubber reset times required. For example, when the top switch S1, S3, S5 is ON, its corresponding bottom switch S4, S6, S2, respectively, is OFF and vice versa. FIG. 1C shows firing pulses for a given phase. Other phases are delayed by 120 degrees and 240 degrees.

2

FIG. 2 illustrates a prior art block diagram of a control logic for a single inverter. The traction motor control logic illustrated in FIG. 2 generates the firing commands f4 and f5 to phase A. The frequency and timings are controlled such that the AC motor generates the desired amount of torque. Thus, the control logic varies the flux, frequency, voltage, current etc in the machine. The control logic also functions to protect the traction motor and the traction inverter components. The output of this logic is a three phase command, one to each of the phases A, B and C. When a firing command signal is high, its corresponding top (positive) switch is turned ON and when the signal is low the bottom (negative) switch is turned ON. Signal f1 is the phase A command signal so that FIG. 2 illustrates the details of phase A. Phases B and C are similarly configured. The phase A firing command is split into the top and bottom switch command signals f2 and f2. The gate driver/switch receives signals f2 and f3 and the status feedback is sent back to the control logic. Signals f4 and f5 are the status feedback from the top and bottom switches. Operation of phase B and C are similar.

FIG. 3 is a prior art timing diagram of the logic commands. This figure illustrates the timing diagrams of the various signals for phase A described in FIG. 2. At time t0, the phase A command signal f1 transitions from 0 to 1 indicating that the top switch of phase A should be ON and the bottom switch should be OFF. Since previously the bottom switch was ON, the first event is at t1 where switch command signal f3 (which is the command to the bottom switch) goes low, commanding the bottom switch to turn OFF. At time t2, the bottom switch turns OFF and the status feedback signal f5 transitions to a low value indicating such turn off. This f5 transition is detected by the phase A firing command logic which then commands the top switch ON at time t3 as indicated by the switch command signal f2 going high. This occurs after a short period of time to allow any snubber settling time or margin. As a result, the status feedback signal f4 transitions to a high value at t4 indicating the top switch is ON. This completes a 0 to 1 transition of a phase A command signal f1. Similar timings are illustrated in FIG. 3 for a transition from 1 to 0. In particular, at t5, the phase A command signal f1 transitions to 0, at t6 the top switch command signal f2 transitions to OFF, at t7 the top switch status feedback signal f4 transitions to OFF, at t8 the bottom switch command signal f3 transitions to ON and at t9 the bottom switch status feedback signal f5 transitions to ON. This complete cycle is repeated again starting at time t10.

Thus, as illustrated in FIG. 1A wherein a single inverter supplies all power to an AC motor, it is apparent that the amount of power supplied to the AC traction motor is controlled by and related to the amount of power that can be supplied through a single switch of each phase of the single inverter. As a result, the total power that can be supplied to the AC traction motor is limited by the power rating or the maximum power that each switch can handle. In order to increase the load bearing capacity of a non-highway vehicle, for example, an off highway vehicle, a freight locomotive or a passenger locomotive, the AC traction motor and the power supply to it must be increased to provide more torque for handling the additional load. This in turn requires an increase in the power handled by each of the switches. Unfortunately, IGBTs or GTOs have a limited power handling capability and the cost of designing and manufacturing higher power switches can be prohibitive. Therefore, there is a need for an inverter for supplying power to AC traction motors which can handle additional power requirements and which has a reasonable manufacturing and replacement cost. There is also a need for employing similar components in such inverters as the components presently in use in existing non-highway vehicles in order to reduce the inventory necessary to supply spare parts for such vehicles. There is also a need for a multiple inverter configuration for supplying power to traction motors in which the inverters are balance or matched so that the inverters operate with disparity such that one inverter carries significantly more current than the other, which could cause overheading or burnout.

BRIEF DESCRIPTION OF THE INVENTION

In one form, the invention comprises a circuit for connection to a DC bus for providing power to a traction motor of an non-highway vehicle. A first inverter connects between the DC bus and the traction motor. A second inverter connects between the DC bus and the traction motor. The second inverter is in parallel connection with the first inverter.

In another form, the invention comprises a non-highway vehicle. An DC power source driven by an engine provides DC power via a DC bus. A circuit connects between a traction motor and the DC bus for providing power to the traction motor. The circuit comprises at least two inventers, a first inverter for connection between the DC bus and the traction motor and a second inverter for connection between the DC bus and the traction motor. The second inverter is in parallel connection with the first inverter. A controller coordinates operation of the first and second inverters.

Various other embodiments and separate aspects of the invention will be described below and/or will be immediately apparent to those skilled in the art.

BRIEF DESCRIPTION OF THE DRAWINGS

The features of the invention believed to be novel are set forth in the appended claims. The invention, however, together with further objects and advantages thereof, may best be understood by reference to the following description taken in conjunction with the accompanying drawings in which:

FIG. 1A is a schematic diagram of a three phase single inverter according to the prior art for supplying power to an AC motor.

FIG. 1B is a timing diagram according to the prior art showing the status of the transistors S1–S6 of FIG. 1A.

FIG. 1C is a timing diagram according to the prior art illustrating phase commands for an exemplary operation of pulse width modulation of each of the transistor S1–S6 of FIG. 1A.

FIG. 2 is a block diagram of control logic according to the prior art for generating the firing commands controlling the status of switches S1–S6 of FIG. 1A.

FIG. 6 illustrates the delay related to a negative to positive transition when the direction of current is from the traction motor to the inverter at the time of switching and assumes that the currents (iax and iay) in the two inverters are the same.

FIG. 7 illustrates the delay related to a negative to positive transition when the direction of current is from the inverter to the traction motor at the time of switching and assumes that the currents (iax and iay) in the two inverters are the same.

FIG. 8 illustrates the delay relating to a positive to negative transition when the direction of current is from the traction motor to the inverter at the time of switching and assumes that the currents (iax and iay) in the two inverters are the same.

FIG. 9 illustrates the delay related to a positive to negative transition when the direction of current is from the inverter to the traction motor at the time of switching and assumes that the currents (iax and iay) in the two inverters are the same.

FIG. 13 is a schematic of a logic and a closed loop current equalizing regulator of the invention for delaying switches which operate faster.

FIG. 14 is a schematic of a logic and a closed loop current equalizing regulator according to another embodiment of the invention for delaying switches which operate faster.

DETAILED DESCRIPTION OF THE INVENTION

Figure 3:
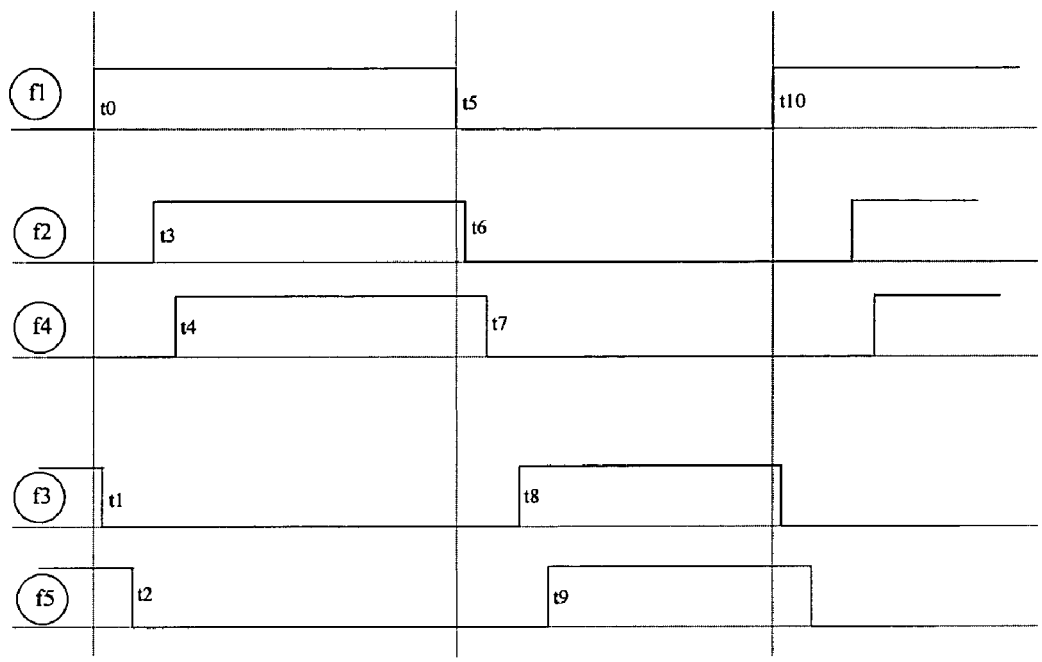
FIG. 3 is a prior art timing diagram of the logic commands f1–f5 employed by the control logic of FIG. 2 when operating according to the prior art.
Figure 4:
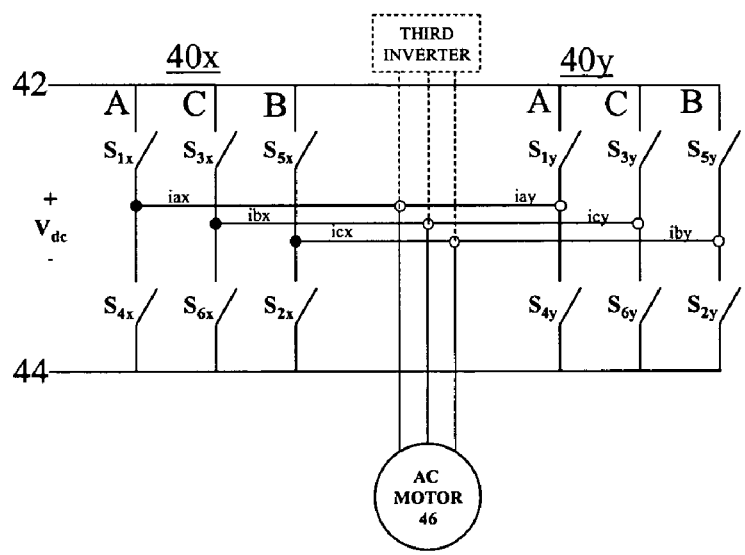
FIG. 4 is a schematic diagram of a three phase dual inverter according to the invention for supplying power to an AC motor.

FIG. 4 illustrates an "ideal" or "model" two inverter schematic diagram according to the invention. As noted above and as will be discussed in greater detail below, this embodiment is referred to as an "ideal" or "model" embodiment because it assumes that all the components are balanced or matched which, in practice, is not frequently attainable or cost effective. In particular, FIG. 4 illustrates a first three phase inverter 40x including switches S1x to S6x and a second three phase inverter 40y including switches S1y to S6y. The inverters 40x and 40y are connected in parallel to a DC bus having a positive rail 42 and a negative rail 44. The two inverters 40x and 40y are similar in configuration to the inverter illustrated in FIG. 1. Inverters 40x and 40y are operated in parallel to increase the total capacity (e.g., torque, current and/or horsepower) of the power being provided to the AC motor 46. Corresponding switches of the two inverters are turned ON and turned OFF at the same time. For example, switch S1x of inverter 40x is operated simultaneously and in the same state as switch S1y of inverter 40y. Similarly, the other five switches of inverter 40x are operated simultaneously with their corresponding switches of inverter 40y.

Those skilled in the art will recognize variations to the dual inverter illustrated in FIG. 4. For example, although the invention has been described herein as a dual inverter, it is contemplated that the invention may be implemented by two or more inverters and that any of the embodiments of the invention may include three or more inverters. For example, FIG. 4 shows a third inverter in phantom, in which case each inverter would be configured and sized to carry one third of the power required by the AC motor 46. Also, although the invention illustrates the inverters in parallel, certain embodiments may employ a series configuration. Also, although the invention has been illustrated as supplying power to a three phase motor, it is contemplated that it may be used to power any multi-winding motor such a two phase or a six phase motor. For example, for a six phase motor, the first three phases of the motor may be operated 120° apart in synchronism with the last three phases, respectively, or the first three phases may be operated 120° apart and 180° out of synchronism with the last three phases, respectively. In addition, although the inverter has been illustrated as a "model" inverter, other embodiments including embodiments wherein the inverters are balanced or matched, as noted below, fall within the scope of the invention.

Figure 5:
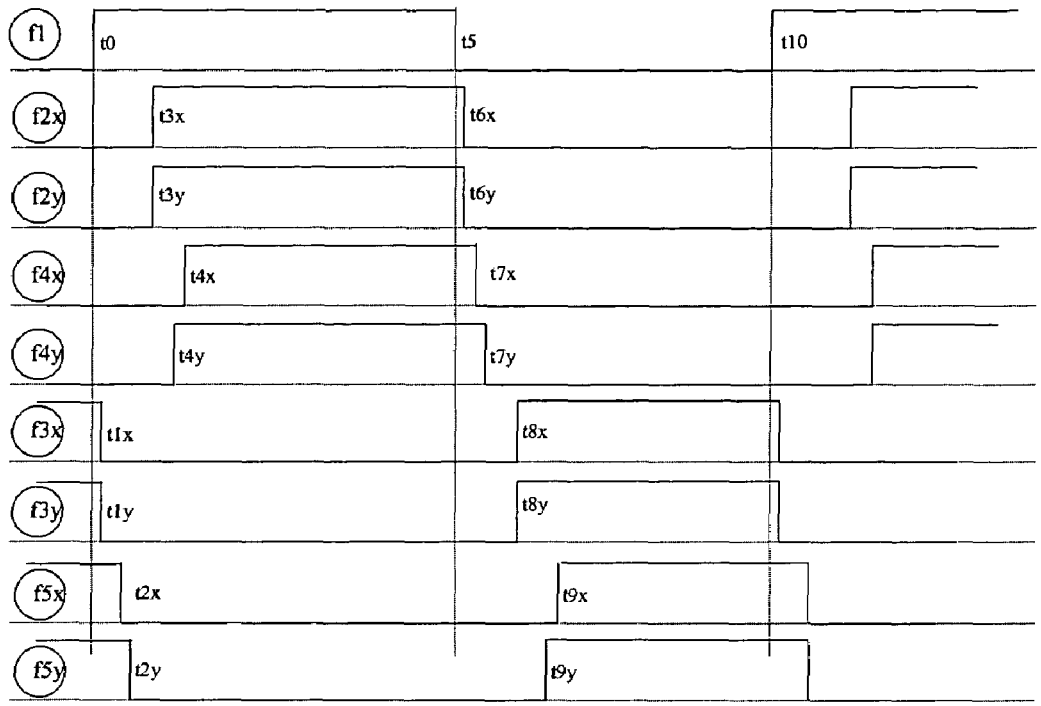
FIG. 5 is a timing diagram of the logic commands f1–f5 employed by the control logic of FIG. 2 of one phase when operating according to the invention.

FIG. 5 illustrates the timing diagram of the various logic signals for phase A of the inverters 40x and 40y illustrated in FIG. 4. At time t0, the phase A command signal f1 transitions from 0 to 1 indicating that the top switches should be ON and the bottom switches should be OFF. Since previously the bottom switches were ON, the first events are at t1x and t1y where switch command signals f3x and f3y (commands to the bottom switches S4x and S4y) go low, commanding the bottom switches to turn OFF. At time t2x and t2y, the bottom switches S4x and S4y turn OFF as indicated by the status feedback signals f5x and f5y transitioning from a high to a low value. When the phase A firing command logic detects that both signals f5x and f5y have transitioned to a low signal, it waits a small amount of time (for any snubber settling time or margin) and commands the top switches S1x and S1y to turn ON at time t3x and t3y as indicated by switch command signals f2x and f2y transitioning from a low value to a high value. As a result, the status feedback signals f4x and f4y transition to a high value at time t4x and t4y indicating the top switches S1x and S1y are closed or ON. This completes a 0 to 1 transition for the phase A command. Similar timings are illustrated for the transitions from 1 to 0. In particular, at time t5, the motor control logic signal f1 transitions to a 0, at t6x and t6y the top switch command signals f2x and f2y transition to OFF, at time t7x and t7y the top switch feedback status signals f4x and f4y transition to OFF indicating that switches S1x and S1y are open, at time t8x and t8y the bottom switch command signals f2x and f2y transition to ON and at time t9x and t9y the bottom switch feedback status signals f5x and f5y transition to ON indicating that the bottom switches S4x and S4y are closed. This completes one cycle for phase A which begins to repeat again at time t10. The phase B top switch S5x and the phase B bottom switch S2x are operated similarly 120° out of phase or later than the phase A switches, the phase B switches being responsive to the phase B command signal. The phase C top switch S3x and the phase C bottom switch S6x are similarly operated 120° after the phase B switches. Corresponding switches of inverter 40x and 40y are operated simultaneously. Thus, phase A top switches S1x and S1y are operated simultaneously; phase A bottom switches S4x and S4y are operated simultaneously; phase B top switches S5x and S5y are operated simultaneously; phase B bottom switches S2x and S2y are operated simultaneously; phase C top switches S3x and S3y are operated simultaneously and phase C bottom switches S6x and S6y are operated simultaneously.

In contrast to the single inverter configuration as illustrated in FIG. 1A, in which a single switch supplies all power to the AC traction motor, it can be seen that the invention as illustrated in FIG. 4 is configured such that two switches simultaneously supply power to the AC traction motor 46. Since the two switches are operating in parallel off the same rails 42 and 44 of the DC bus, each switch can have a power rating which is approximately half the total power to be delivered to the AC induction motor 46. In FIG. 1, the power to be provided to the motor is limited by the maximum power rating of the switches. In contrast, according to FIG. 4 and the invention, the power to be supplied to the AC traction motor 46 is limited by double the power rating of the switches. Thus, the size of the AC traction motor 46 can effectively be doubled since it can be provided with twice the power without a need for an increase in the sizing of the components. For example, according to the prior art, IGBTs have a nominal operating range of 0–2500v and 0–2400A and have a preferred maximum operating limit of 1500v and 2000A. According to the prior art, AC induction motors operating with such IGBTs generally operate at a torque range of 11,000 lbft, a current range of 1000ARMS (amperes RMS), and a horsepower rating of 1500. In order to increase these parameters of the AC induction motor, larger rated components would be required. In contrast, according to the invention, such IGBTs can be used in combination with a motor having a current operating range of 2000ARMS, a torque operating range of 22,000 lbft, and a horsepower rating of 3000. (Note: these are only examples of operating ranges and amounts.)

Another aspect of the invention is that the components S1x–S6x and S1y–S6y of the dual inverters illustrated in FIG. 4 are the same as the components S1–S6 of the single three phase inverter illustrated in FIG. 1A. Thus, additional inventory is not needed to supply the switches of the dual inverter according to the invention as compared to the switches of the single inverter according to the prior art since both inverters employ the same switching components. Another aspect of the invention is that it provides a fail-safe configuration. For example, if one of the switches of one of the dual inverters fails in an open state, operation of the motor is still possible since the other inverter can supply half power (or more) to the motor.

Figure 6:
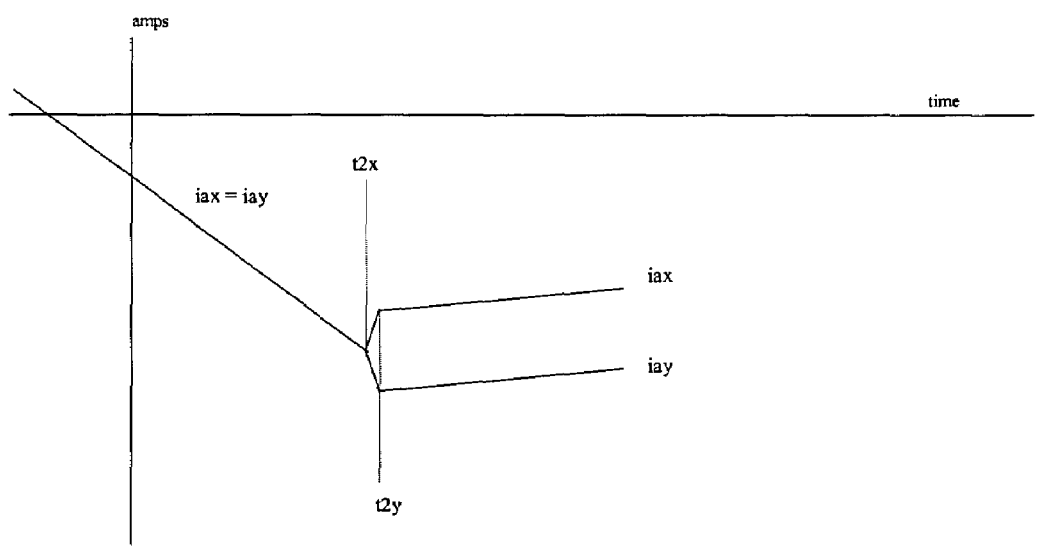
FIG. 6 is a timing diagram illustrating the time delay between the actual turn off event of the negative switches (e.g., switches S4$x$ and S4$y$ as controlled by f5$x$ and f5$y$ at times t2$x$ and t2$y$, respectively, of FIG. 5).

FIG. 6 illustrates the current waveform for current flowing into the inverter when a negative to positive transition of a switch occurs. In this illustration, the negative switch turn off would effectively control the current. FIG. 6 shows the effect of the time delay between the actual turn off of the negative switches (e.g., the turn off of switches S4x, S6x and S2x at t2x and the turn off of switches S4y, S6y and S2y at t2y per FIG. 5). FIG. 6 assumes that the direction of current is from the load to the inverter at the time of the transition of the switches and further assumes that the current in the two inverters, i.e., the phase A current iax in inverter 40x and the phase A current iay in inverter 40y) are the same.

At time t2x, switch S4x of inverter 40x turns OFF. The current in inverter 40x will switch to the freewheeling path of switch S1x. The total load current remains relatively constant due to the large load inductance. The current levels in the two inverters will differ since S1x and S4y are conducting. The rate at which the currents diverge depends on primarily the inductance in this path. At time t2y, the switch S4y also turns off and the current will be flowing through the freewheeling path of S1x and S1y. If the inductance to each of the inverters is the same, then the slope of the currents will be the same. So any current difference between the two inverters will remain essentially the same. The difference will die down based on the L/R value. After repeated switching events, the current differences will tend to keep increasing.

Figure 7:
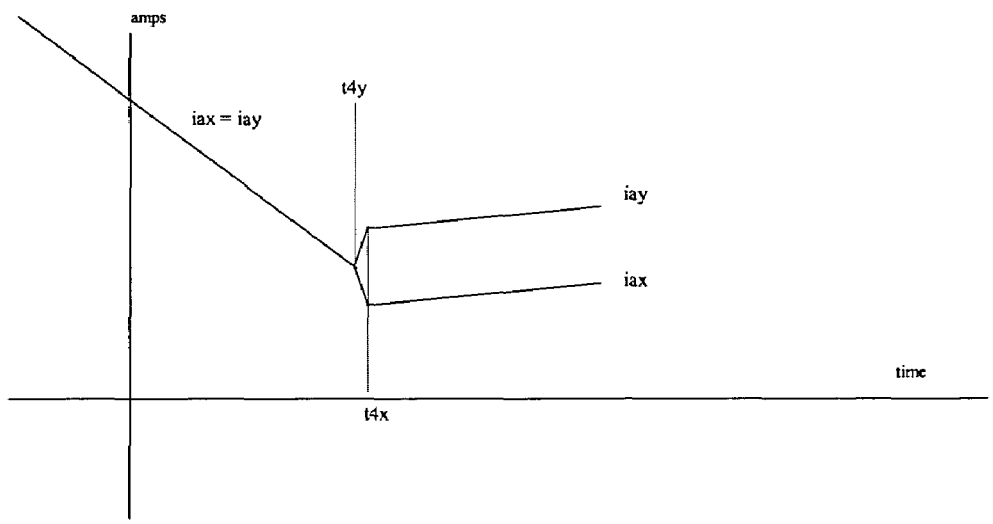
FIG. 7 is a timing diagram illustrating the time delay between the actual turn off event of the negative switches (e.g., switches S1$x$ and S1$y$ as controlled by f4$x$ and f4$y$ at times t4$x$ and t4$y$, respectively, of FIG. 5).

FIG. 7 illustrates the current waveform when current is flowing out of the inverter during a negative to positive transition of the switches. FIG. 7 illustrates the effects of the time delay between the actual turn off of the negative switches when the direction of current is to the load from the inverter at the time of turn off. At the time of turn off, the current is flowing through the freewheeling diodes so that the commands to turn off devices S4x and S4y have no effect. However, at time t4y, when switch S1y turns on, the current iay flowing through S1y will increase and the current iax flowing through the freewheeling diode of S1x will decrease. Once switch S1x also turns on, the currents will rise at an equal rate.

Figure 8:
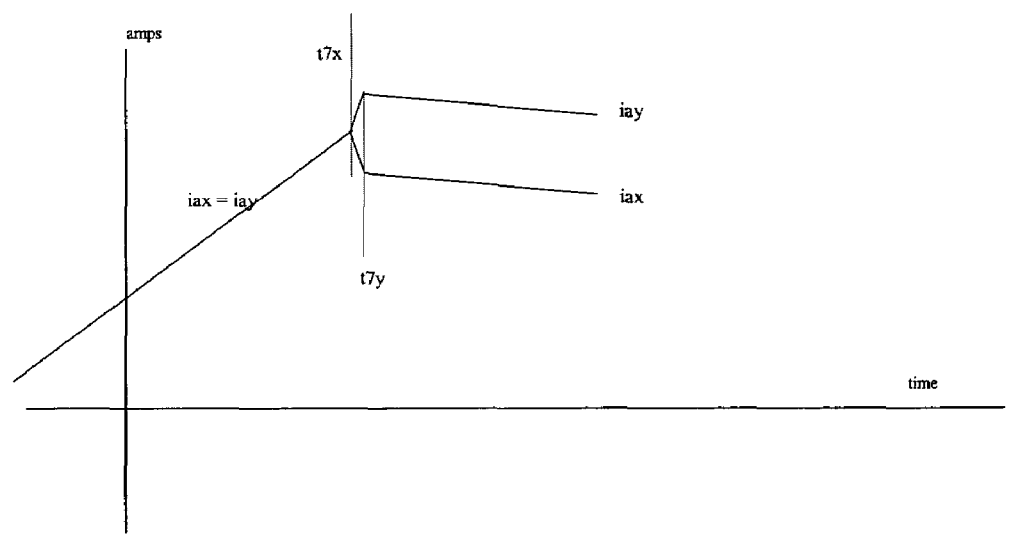
FIG. 8 is a timing diagram illustrating the time delay between the actual turn off event of the negative switches (e.g., switches S1$x$ and S1$y$ as controlled by f4$x$ and f4$y$ at times t7$x$ and t7$y$, respectively, of FIG. 5).
Figure 9:
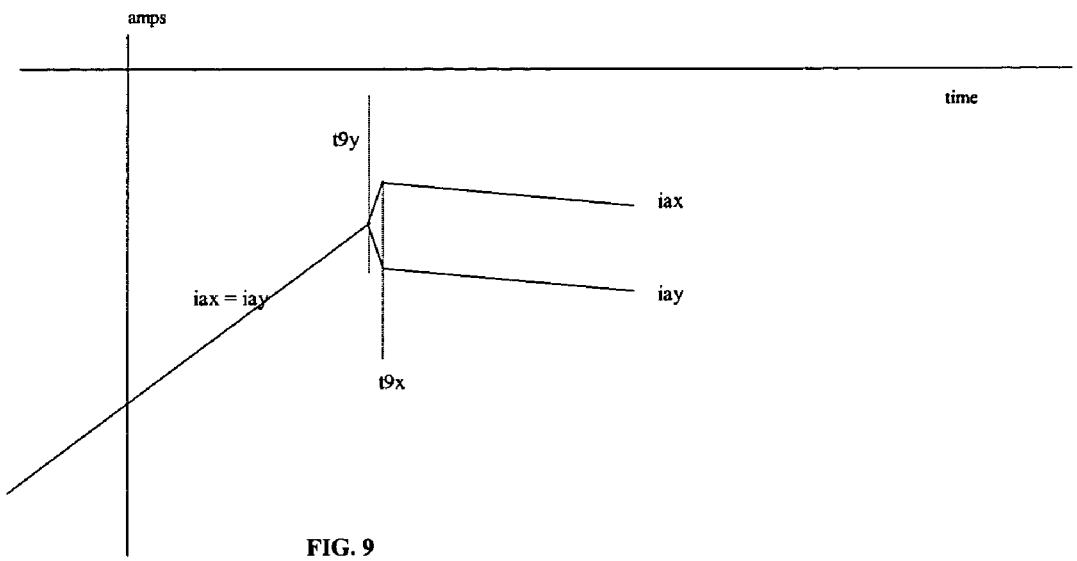
FIG. 9 is a timing diagram illustrating the time delay between the actual turn off event of the negative switches (e.g., switches S4$x$ and S4$y$ as controlled by f5$x$ and f5$y$ at times t9$x$ and t9$y$ respectively, of FIG. 5).

FIG. 8 is similar to FIG. 6 and illustrates the current waveform when current is flowing out of the inverter during a transition from positive to negative of a switch. FIG. 9 is similar to FIG. 7 and illustrates the current waveform when current is flowing into the inverter during a positive to negative transition of a switch.

Figure 10:
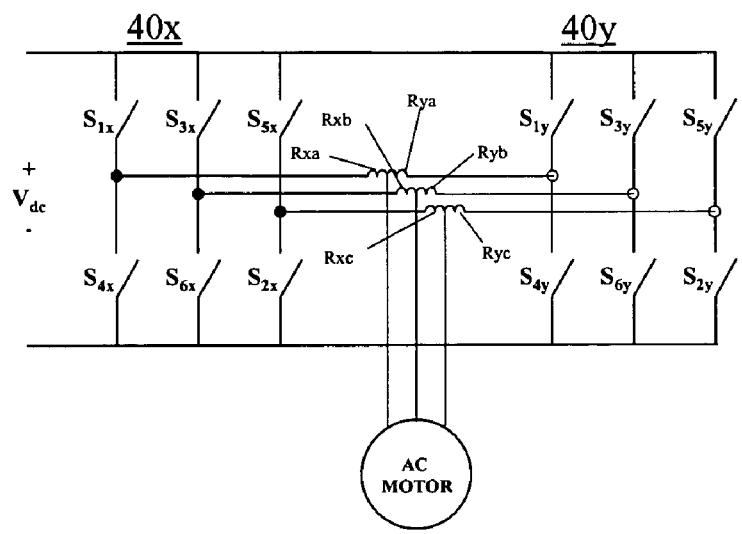
FIG. 10 is a schematic diagram illustrating a three phase dual inverter of the invention for supplying power to an AC motor including impedance devices in each phase.

Thus, as can be seen by reviewing FIGS. 6–9, current differences develop between the currents flowing through the switches in the dual inverters because of a number of factors including varying impedance and varying timing. In order to reduce the current difference or disparity, it is contemplated that one or more devices such as a resistance, or reactance (e.g., inductance or capacitance)or any other impedance devices may be located in series with each phase to provide a reactance which matches or balances the inverters. Thus, as illustrated in FIG. 10, the two inverter schematic diagram includes a reactance Rxa in phase A of the inverter 40x and includes a reactance Rya in phase A of the inverter 40y. Similarly, phases B and C include reactances Rxb, Ryb, Rxc and Ryc. These reactances in each phase limit the rate of change of current difference and the resistance of the reactants brings the current difference back to zero after each switching cycle. However, such reactances can be costly and require considerable packaging and cooling effort.

Figure 11:
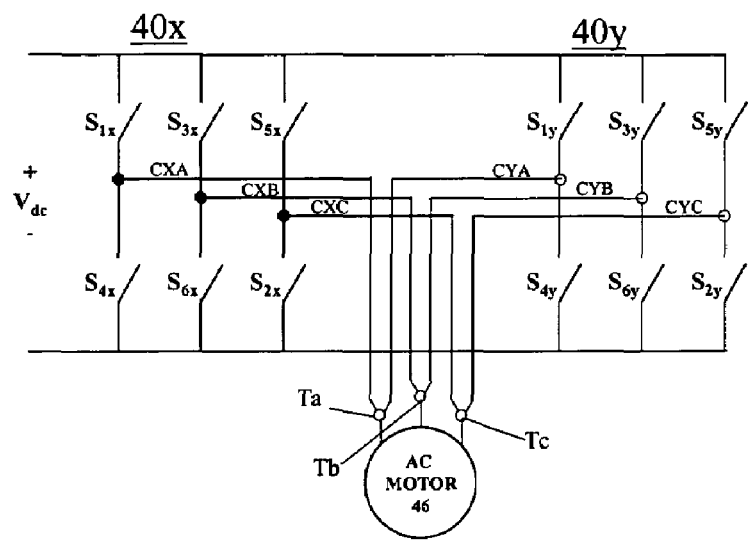
FIG. 11 is a schematic diagram of a three phase dual inverter of the invention for supplying power to an AC motor including independent cables connecting each phase component of the inverter to the corresponding phase winding of the traction motor.

FIG. 11 illustrates another preferred aspect of the invention in which independent wiring is used to interconnect the dual inverters with the AC traction motor. In particular, the AC traction motor 46 includes terminals Ta, Tb and Tc on or in close proximity to the motor 46 for receiving the energizing power for phases A, B and C, respectively, for energizing the separate windings of the motor 46. A cable Cxa interconnects phase A of inverter 40x with motor terminal Ta. A cable Cxb connects the switches of phase B of inverter 40x with motor terminal Tb. A cable Cxc connects the switches of phase C of inverter 40x with motor terminal Tc. Similarly, separate cables Cya, Cyb and Cyc connect phases A, B and C of inverter 40y with motor terminals Ta, Tb and Tc, respectively. These cables will carry half the current from each motor 46. Because of their length and geometry, these cables offer some inductance and resistance. As compared to the reactants approach illustrated in FIG. 10, these cables provide much less cost and/or do not necessarily require cooling or other packaging issues. Typically, there is some distance (e.g., 20–100 feet or more) between the motor (which is frequently located under the platform/truck) and the inverter (which is frequently located over the platform/deck).

Figure 12:
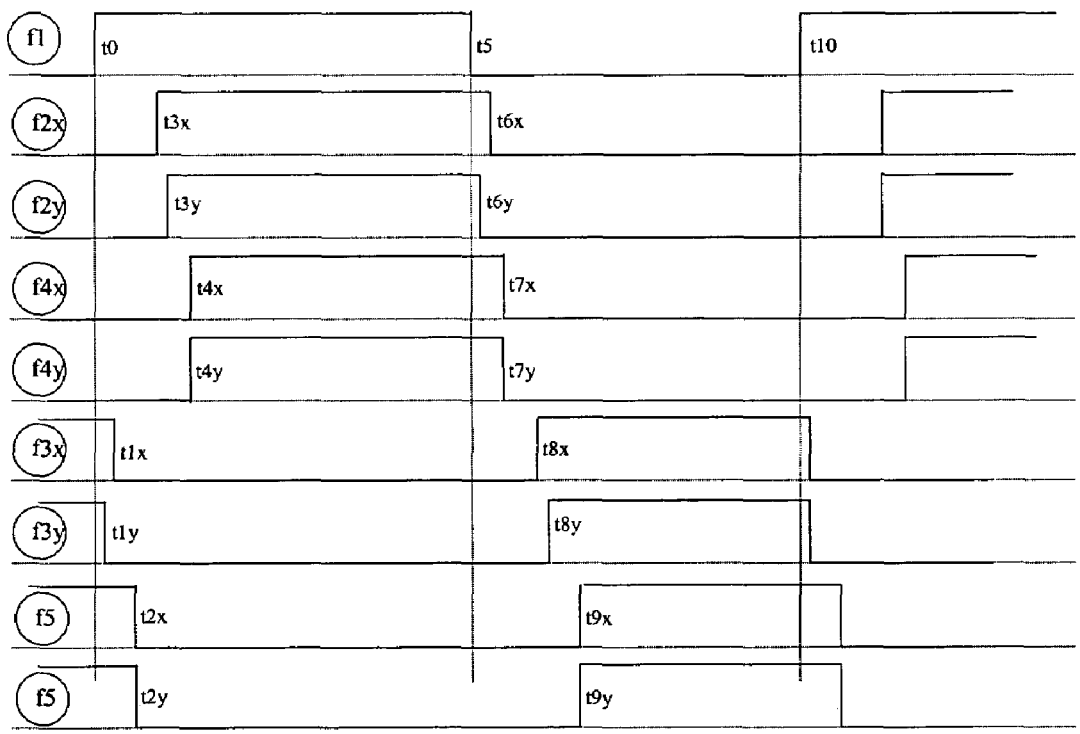
FIG. 12 is a timing diagram of the logic commands f1–f5 employed by the control logic of FIG. 2 when operating according to another embodiment of the invention employing a control algorithm to delay switches which operate faster.

In another embodiment according to the invention, it is contemplated that the controller which controls the switches of the inverters may employ an optimizing algorithm to vary the timing of the transition of the switches. FIG. 12 illustrates a timing diagram according to the invention wherein the timing of the switches is optimized. In general, this timing arrangement delays the commands to the switches which operate faster. The faster switches can be determined by empirical data, by specification data, by relative location to other switches, by other information such as actual testing on a circuit-by-circuit basis or by sensing the voltage and/or current and/or status feedback. The purpose of delaying the faster switches is to control any current differences between the two inverters. For example, transitions t1x and t1y which are the switch command signals f2x and f2y for the upper and lower switches, respectively, occur at different times compared to the timing as illustrated in FIG. 5. Table 1 shows the control logic for the optimized timing diagram according to FIG. 12. In this logic, for every switching point depending on current polarity, there is one switch which can be controlled to balance/match the current.

FIG. 13 illustrates another embodiment according to the invention in which switching delays are determined by control logic which is part of a closed loop regulator (gain control). In particular, the difference between the currents iax and iay is determined by a summer S or other component and provided to a regulator for determining a delay compensation based on a differential. A closed loop regulator 130 monitors the delay compensation signal as well as other parameters of the system such as current, voltage and/or temperature. The regulator 130 has a table or algorithm which defines an optimum delay as a function of the monitored parameters. As illustrated in FIG. 13, delay is illustrated as a function of current and voltage. Other parameters may be temperature, lot (silicon property, manufacturer, gate drive characteristics/type), etc. The regulator 130 determines the adjustment to the delay compensation signal according to the present current and voltage of the system and provides this to an inverter which then provides a corresponding signal to a mixer M for adjusting the delay compensation signal. Thus, the current error is used to computer delay compensation. The regulator 130 normalizes the delay to the current using an algorithm, function generator or look-up table based on the device characteristics and on certain characteristics. The mixed signal from mixer M including delay compensation is applied to the appropriate switch according to the logic illustrated in Table 1.

TABLE 1

Control Logic

| Conditions | Action | Don't' Care | Comments |
|---|---|---|---|
| Current Positive \|ix\| > \|iy\| | Positive Switch Control Delay turn OFF y positive Delay turn ON of x positive | Negative Switch Control | Need to sample current at twice switching freq to select |
| Current Negative \|ix\| > \|iy\| | Negative Switch Control Delay turn OFF x negative Delay turn ON of y negative | Positive Switch Control | Need to sample current at twice switching freq to select |

It is contemplated that three such compensation systems may be employed, one for each of the upper switches of one of the inverters. Alternatively, six compensation systems according to FIG. 13 may be employed, one for each of the six switches for one of the inverters. Alternatively, twelve (12) compensation systems according to FIG. 13 may be employed, one for each edge, current polarity and phase.

FIG. 14 illustrates another embodiment for implementing the current regulator. In FIG. 14 the current error is normalized first based on the device and/or circuit characteristics. In particular, depending on the current and/or voltage (and/or temperature) as detected by a regulator (gain control) 40 and depending on the program or table used therein, a first nominal delay signal is provided to an x/y adjustment of the current differential. The output of this block gives a percentage/fractional delay needed to correct the current. This adjusted differential current is provided to the regulator which produces a second delay signal which is then accumulated by a feedback loop. The output of this block which represents percentage/fractional delay correction is converted to the real delay time required by the gain equalization look up based on current operating conditions.

Figure 15:
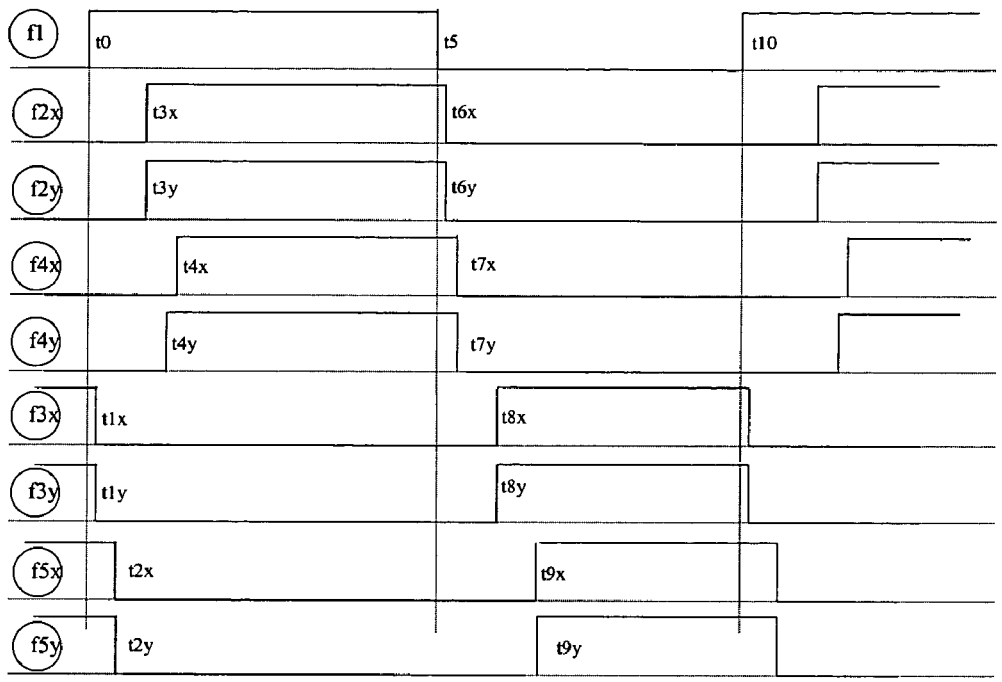
FIG. 15 is a timing diagram of the logic commands f1–f5 employed by the control logic of FIG. 2 when operating according to another embodiment of the invention in which the positive ON event is delayed.
Figure 16:
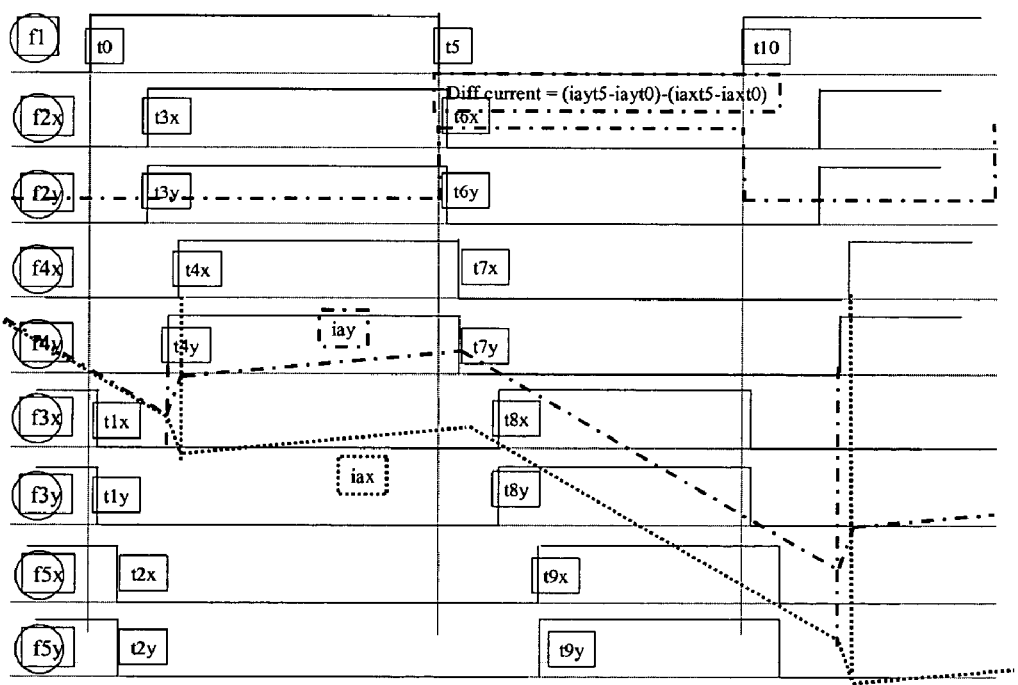
FIG. 16 is a timing diagram illustrating the differential positive current [Differential current=(iayt5–iayt0)–(iaxt5–iaxt0)] overlaying the logic commands of FIG. 15.
Figure 17:
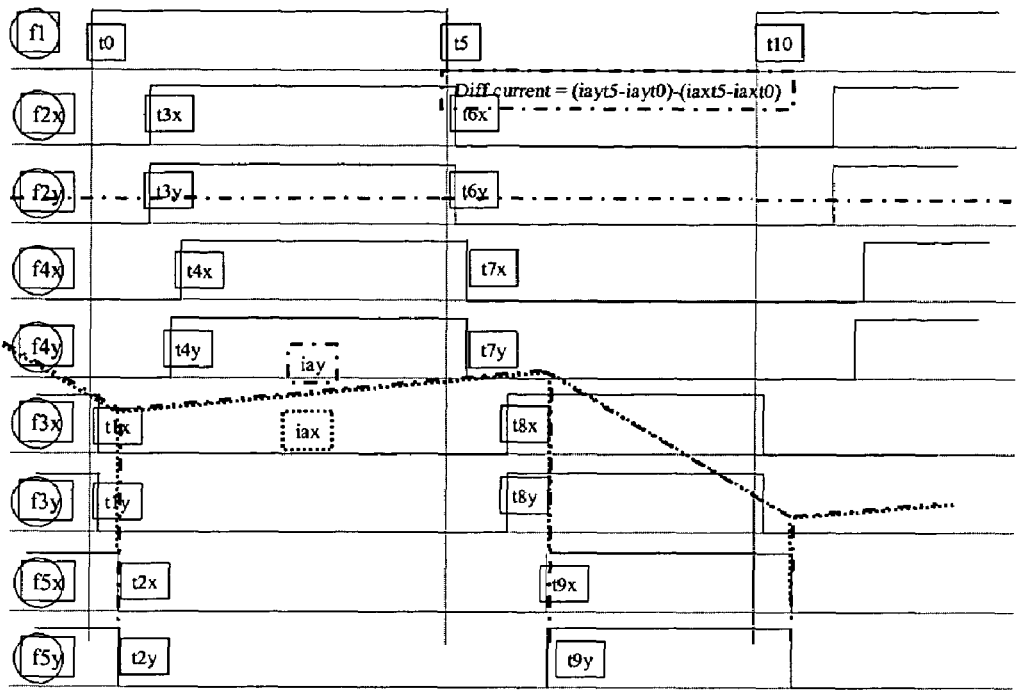
FIG. 17 is a timing diagram illustrating the differential negative current [Differential current=(iayt5–iayt0)–(iaxt5–iaxt0)] overlaying the logic commands of FIG. 15.
Figure 18:
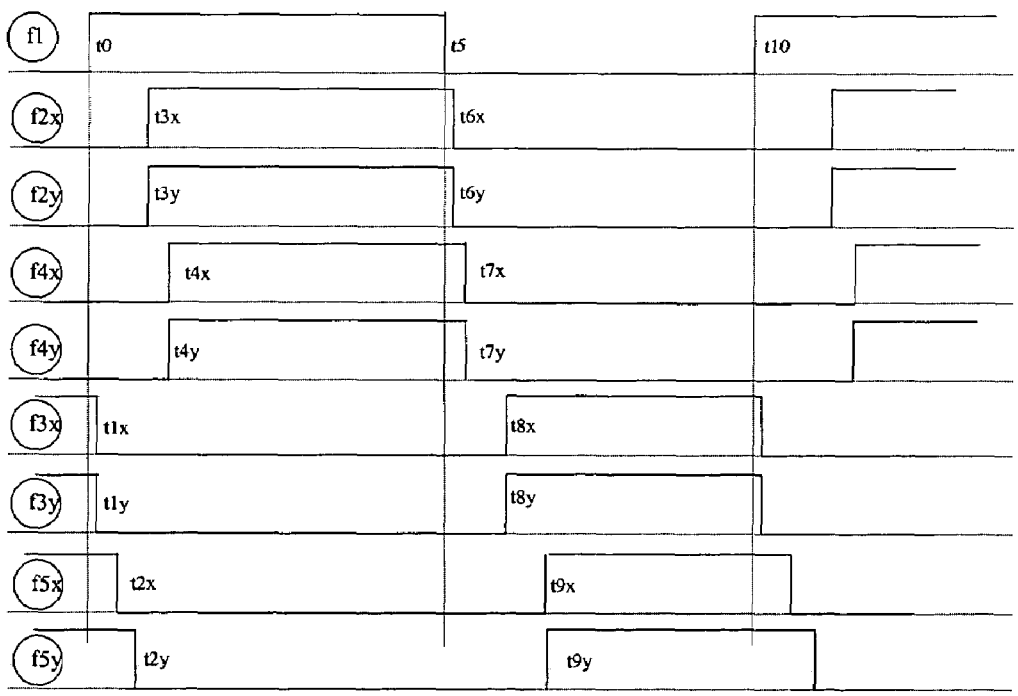
FIG. 18 is a timing diagram of the logic commands f1–f5 employed by the control logic of FIG. 2 when operating according to another embodiment of the invention in which the negative OFF event is delayed.
Figure 19:
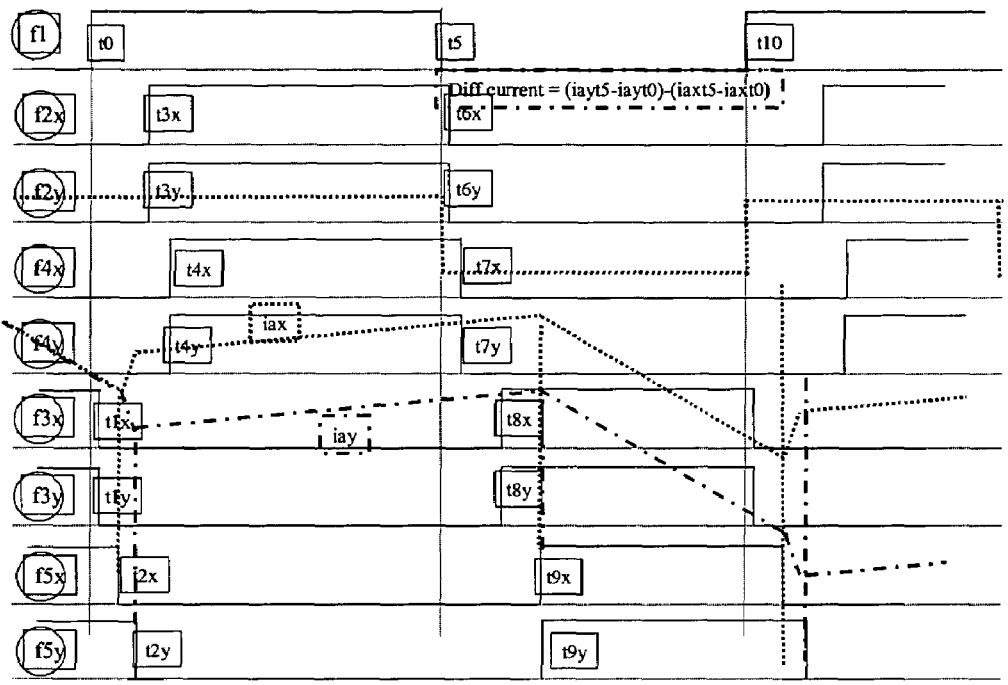
FIG. 19 is a timing diagram illustrating the differential negative current [Differential current=(iayt5–iayt0)–(iaxt5–iaxt0)] overlaying the logic commands of FIG. 18.
Figure 20:
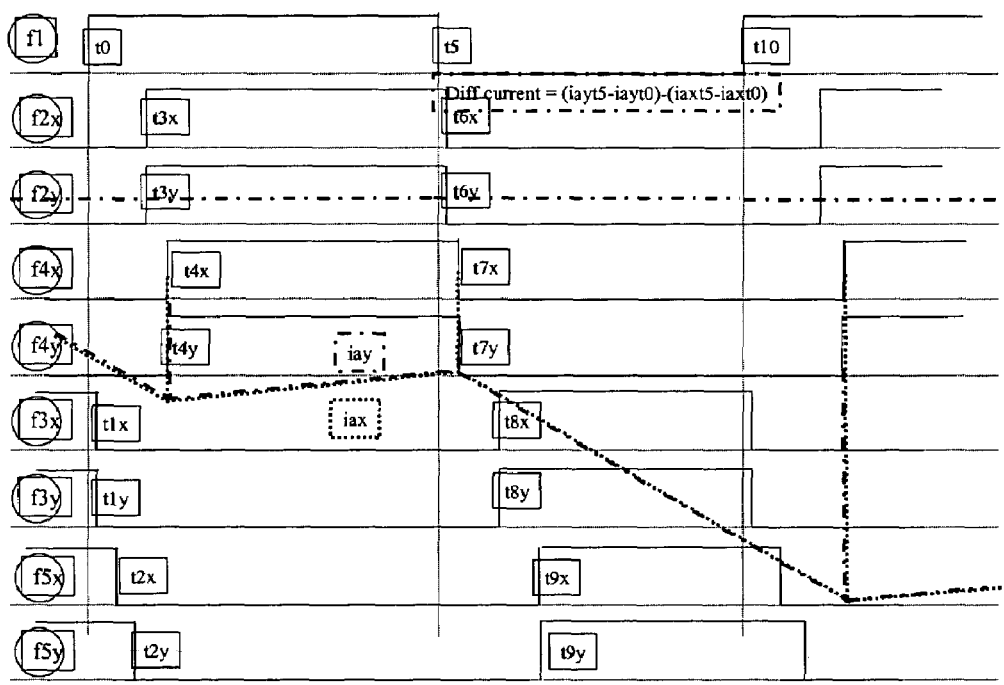
FIG. 20 is a timing diagram illustrating the differential positive current [Differential current=(iayt5–iayt0)–(iaxt5–iaxt0)] overlaying the logic commands of FIG. 18.
Figure 21:
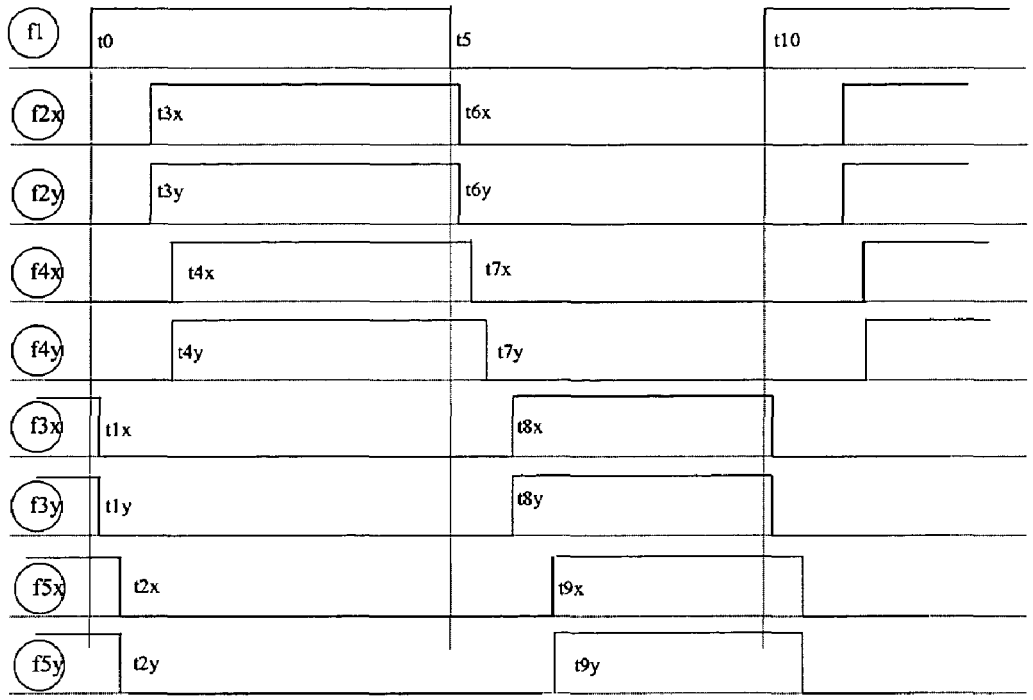
FIG. 21 is a timing diagram of the logic commands f1–f5 employed by the control logic of FIG. 2 when operating according to another embodiment of the invention in which the positive OFF event is delayed.
Figure 22:
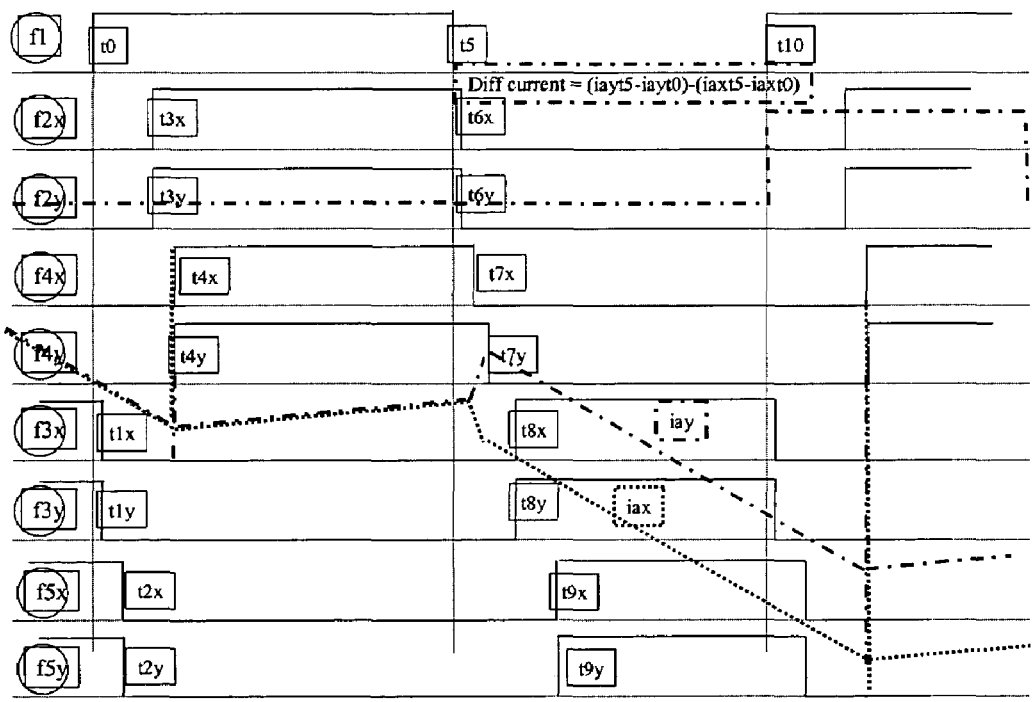
FIG. 22 is a timing diagram illustrating the differential positive current [Differential current=(iayt5–iayt0)–(iaxt5–iaxt0)] overlaying the logic commands of FIG. 21.
Figure 23:
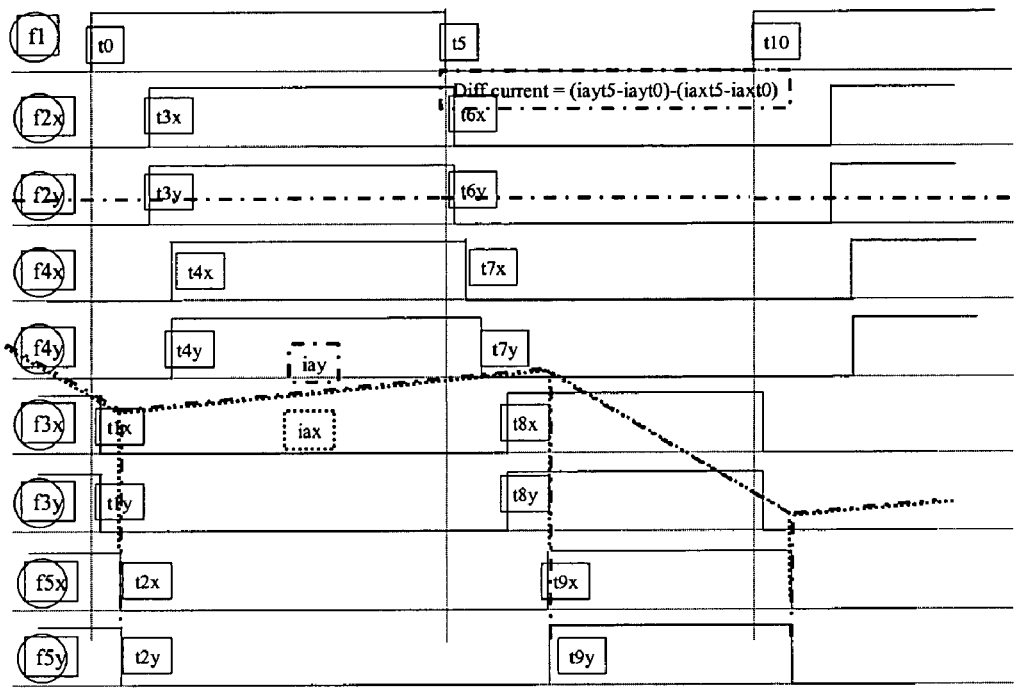
FIG. 23 is a timing diagram illustrating the differential negative current [Differential current=(iayt5–iayt0)–(iaxt5–iaxt0)] overlaying the logic commands of FIG. 21.
Figure 24:
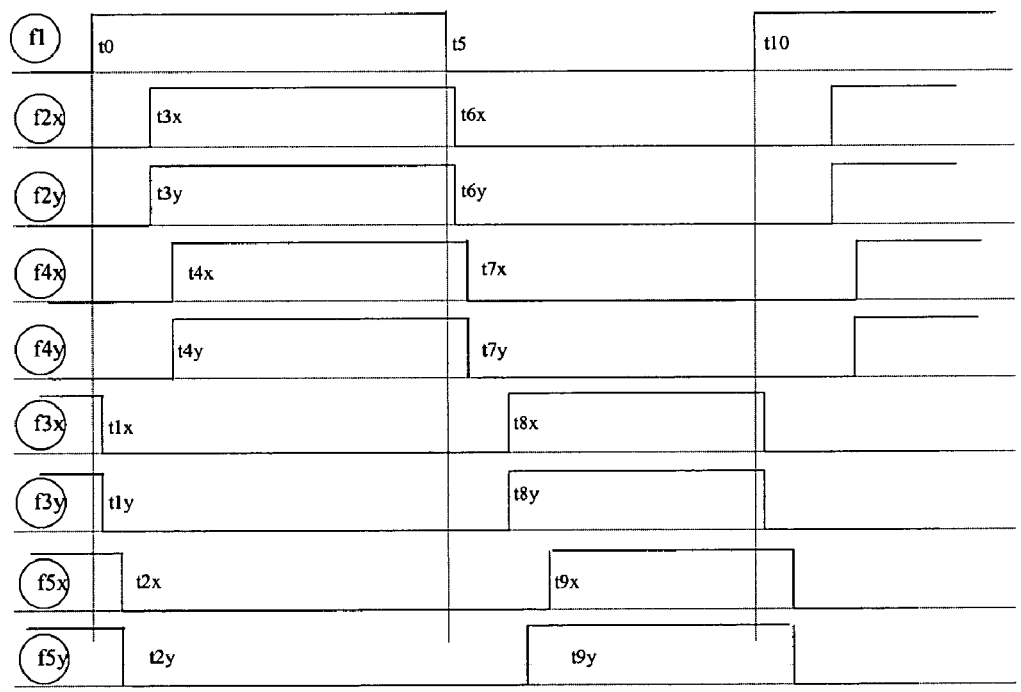
FIG. 24 is a timing diagram of the logic commands f1–f5 employed by the control logic of FIG. 2 when operating according to another embodiment of the invention in which the negative ON event is delayed.
Figure 25:
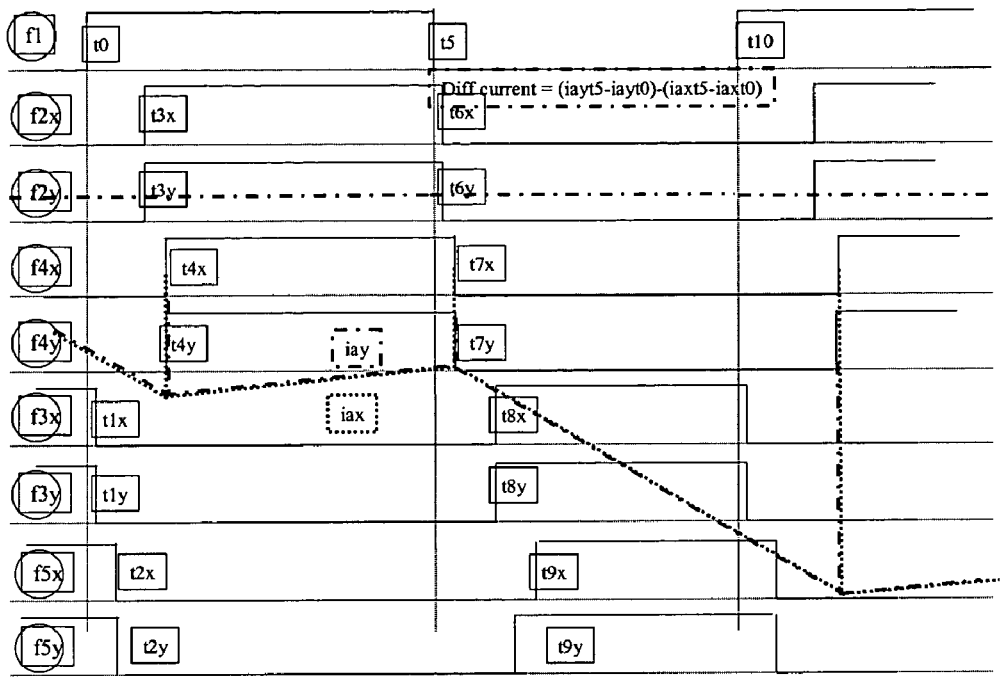
FIG. 25 is a timing diagram illustrating the differential positive current [Differential current=(iayt5–iayt0)–(iaxt5–iaxt0)] overlaying the logic commands of FIG. 24.
Figure 26:
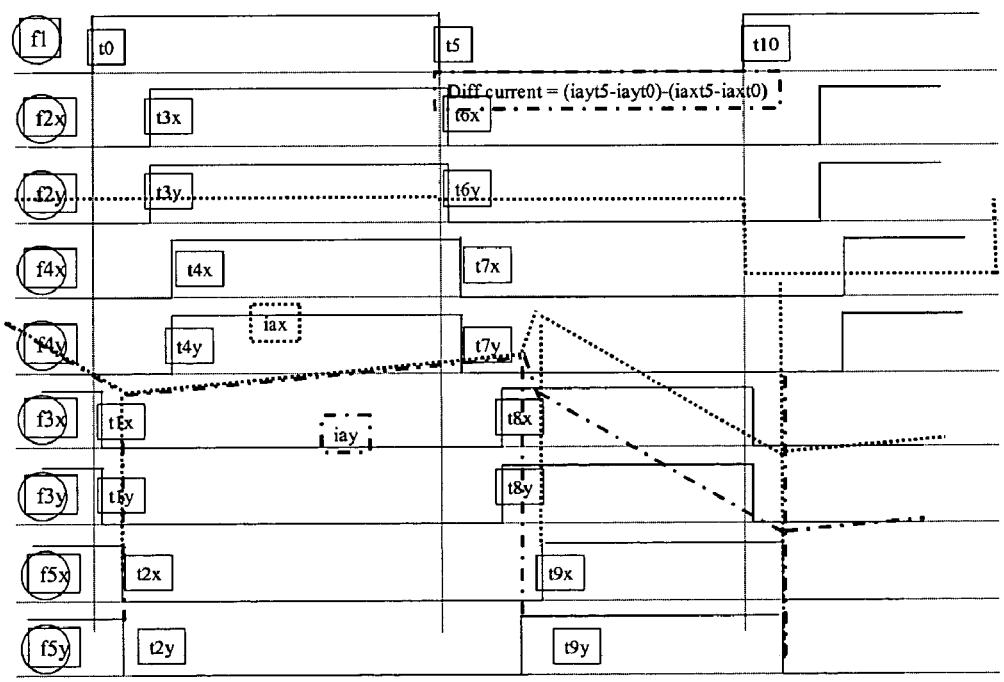
FIG. 26 is a timing diagram illustrating the differential negative current [Differential current=(iayt5–iayt0)–(iaxt5–iaxt0)] overlaying the logic commands of FIG. 18.

FIG. 15 illustrates a timing diagram wherein one positive switch has a delay during turn ON transition. All other switchings are assumed to be ideal. ON transitions are delayed. FIG. 16 (see modified figure) illustrates a timing diagram corresponding to FIG. 15 for positive current whereas FIG. 17 (see modified figure) illustrates a timing diagram for negative current. FIG. 16 shows the current iax and iay. If currents are sampled at t0 and t5 (2 samples per switching), at t5 the differential current due to switching delays during t0 to t5 time is given by the difference in the change of current in x during t0 to t5 and the change in current in y during t0 to t5. In other words, diff current= (iayt5−iayt0)−(iaxt5−iaxt0). This differential current can be used to compensate the delay in the appropriate switch based on the polarity of the current. In FIG. 17 it shows that no compensation is necessary for the negative current case. Similarly, FIG. 18 illustrates a preferred embodiment of a timing diagram for a negative OFF delay and FIGS. 19 (see modified figure) and 20 (see modified figure) illustrate the timing diagram for negative current and positive current. FIG. 21 illustrates a timing diagram for a positive OFF delay and FIGS. 22 (see modified figure) and 23 (see modified figure) illustrates a timing diagram for positive and negative current. FIG. 24 illustrates a timing diagram for negative ON delay and FIGS. 25 (see modified figure) and 26 (see modified figure) illustrate a timing diagram for positive and negative current. If currents are sampled 4 times a switching cycle, for example at t0, t3, t5 and t8, then differential current could directly determine which switch and which edge need to be controlled. It should be noted that the currents could also be different due to conduction loss differences as well as switching time differences. The overall current difference due to conduction loss difference is also compensated by adjusting the switching times. Typically, the conduction loss differences are small.

Table 2 illustrates one preferred embodiment of the control selection logic according to the invention using 2 samples per switching cycle. Table 3 shows the logic for 4 samplings per switching cycle.

TABLE 2

Control Delay Selection Logic

| Switch | Switch Delay Edge | Current Polarity | Differential current/Edge | Control for twice sampling (at t0 and t5) |
|---|---|---|---|---|
| Positive | ON | Positive | Positive to Negative Command | Delay + ON switch with |

TABLE 2-continued

Control Delay Selection Logic

| Switch | Switch Delay Edge | Current Polarity | Differential current/Edge | Control for twice sampling (at t0 and t5) |
|---|---|---|---|---|
| | | | Transition | positive differential current |
| Positive | ON | Negative | No count | |
| Positive | OFF | Positive | Negative to Positive Command Transition | Delay + OFF switch with negative differential current |
| Positive | OFF | Negative | No count | |
| Negative | ON | Positive | No count | |
| Negative | ON | Negative | Negative to Positive Command Transition | Delay − ON switch with negative differential current |
| Negative | OFF | Positive | No count | |
| Negative | OFF | Negative | Positive to Negative Command Transition | Delay − OFF switch with positive differential current |

TABLE 3

Control Delay Selection Logic for 4 samples per switching cycle

| Differential current interval | Control Delay Edge |
|---|---|
| T0/t1 to t3 | Delay t1 |
| T3 to t5 | Delay t3 |
| T5/t6 to t8 | Delay t6 |
| T8 to t10 | Delay t8 |

Figure 27:
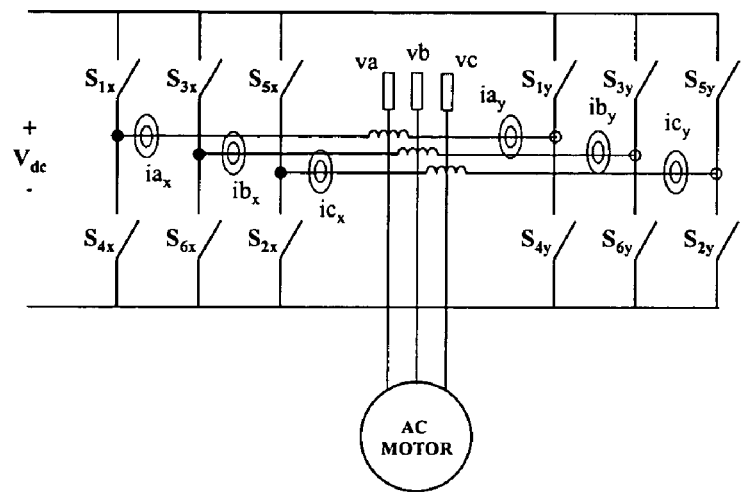
FIG. 27 is a schematic diagram illustrating the invention for employing current and voltage sensors in the dual inverter of FIG. 10.
Figure 28:
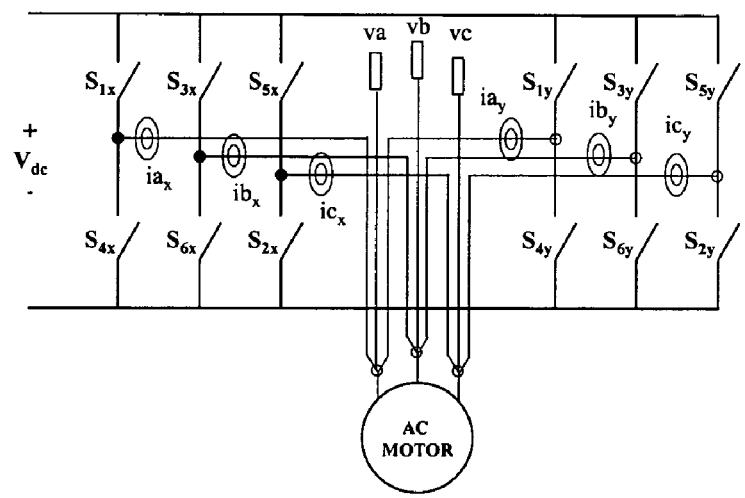
FIG. 28 is a schematic diagram illustrating the invention for employing current and voltage sensors in the dual inverter of FIG. 11.
Figure 29:
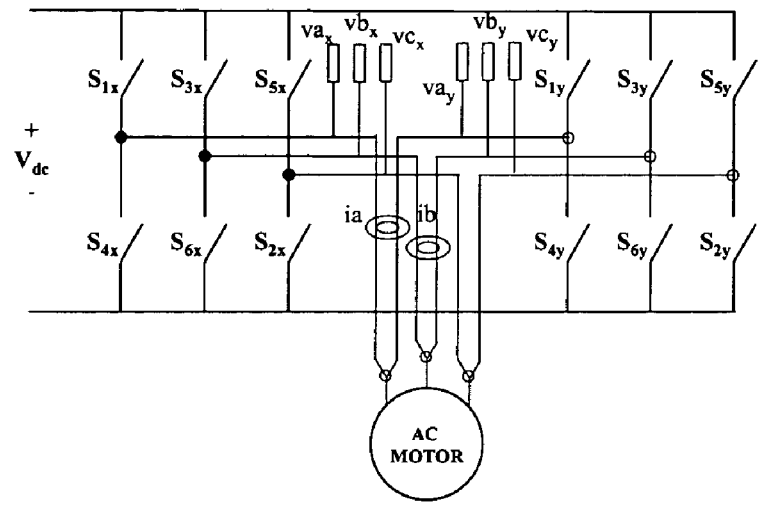
FIG. 29 is a schematic diagram illustrating another embodiment according to the invention for employing current and voltage sensors in the dual inverter of FIG. 11.
Figure 30:
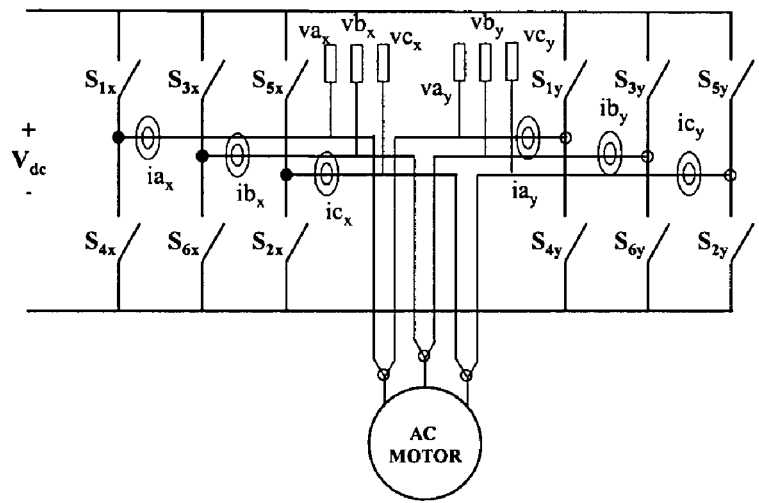
FIG. 30 is a schematic diagram illustrating another embodiment according to the invention for employing current and voltage sensors in the dual inverter of FIG. 11.
Figure 31:
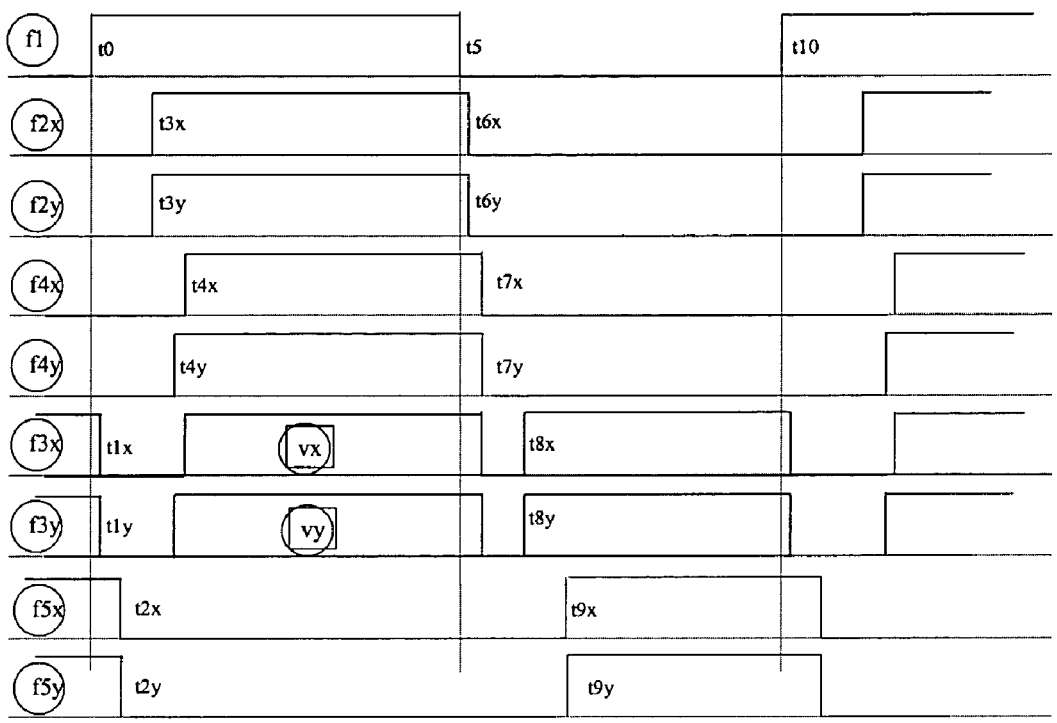
FIG. 31 is a timing diagram of the logic commands f1–f5 employed by the control logic of FIG. 2 when operating according to another embodiment of the invention in which the positive ON event is delayed (e.g., FIGS. 15 and 16) showing the voltages Vx and Vy.

FIG. 27 illustrates the current and voltage sensors used for the two inverter configuration with reactants as illustrated in FIG. 10. Current sensors iax, iay, ibx, iby, icx and icy are used to control motor torque and for differential current control. Voltage sensors va, vb and vc are used to control motor torque. Alternatively, FIGS. 28, 29 and 30 illustrate three embodiments for positioning current sensors and voltage sensors in a two inverter system according to the invention with independent wires as illustrated in FIG. 11. These current and voltage sensors are used to provide inputs to the regulators 130 and 140 of FIGS. 13 and 14, respectively. In FIG. 28, lumped inductors have been removed and cable impedance is depended upon. FIG. 29 uses two (motor) current sensors and six voltage sensors vax, vay, vbx, vby, vcx and vcy. The sensors vax and vay are averaged for motor torque control and the differential voltage is used to control the balance/match current. FIG. 30 uses 6 voltage and 6 current sensors. This provides all degrees of freedom for control and diagnostics. If conduction loss differences are ignored, it is possible to compensated with voltage sensors like vax and vay without using independent current sensors (for example, see the sensing scheme used in FIG. 29). In this case the exact switching interval can be obtained from the voltage sensors. FIG. 31 shows the voltage for the case shown in FIG. 16. Vy will go from 0 to full dc voltage first and Vx will change after the delay. The voltage delay can be determined and used to compensate the appropriate (leading or trailing) edge. For example, if the voltage transition happens during t3 to t5, then t3's edge needs to be controlled whereas if the voltage transition happens between to and t3, then t1's edge need to be controlled. The differential volt seconds may also be used to compensate the timings.

This invention solves the longstanding problem of expanding the capacity of non-highway vehicles at a reasonably low cost and without the need for high cost inverter components. This invention also solves the longstanding problem of need for a reasonably low cost inverter system for higher power motors in which the inverter system includes low cost, off the shelf components.

When introducing elements of the present invention or the embodiment(s) thereof, the articles "a," "an," "the," and "said" are intended to mean that there are one or more of the elements. The terms "comprising," "including," and "having" are intended to be inclusive and mean that there may be additional elements other than the listed elements.

While various embodiments of the present invention have been illustrated and described, it will be appreciated to those skilled in the art that many changes and modifications may be made thereunto without departing from the spirit and scope of the invention. As various changes could be made in the above constructions without departing from the scope of the invention, it is intended that all matter contained in the above description or shown in the accompanying drawings shall be interpreted as illustrative and not in a limiting sense.

What is claimed is:

1. A non-highway vehicle comprising:
   an engine;
   a DC power source driven by the engine and providing DC power via a DC bus;
   a traction motor;
   a circuit for connection to the DC bus for providing power to the traction motor, said circuit comprising:
      a first inverter for connection between the DC bus and the traction motor; and
      a second inverter for connection between the DC bus and the traction motor whereby the second inverter is in parallel connection with the first inverter;
      a controller for coordinating operation of the first and second inverters, wherein each of the first and second inverters includes switching components and wherein the controller operates the switching components of each of the inverters in a timing pattern that takes into account the turn on delay and/or turn off delay of each switching component;
   a plurality of current sensors, each for sensing a current of one of the switching components,
   a plurality of additional sensors, each for sensing a voltages and/or a temperature of one of the components;
   a delay generator responsive to the current sensors and/or the additional sensors for generating a first delay signal;
   a regulator responsive to the current sensors for generating a second delay signal; and
   a combiner for combining the first delay signal and the second delay signal into a delay compensation signal indicating a delay for switching component.

2. The circuit of claim 1 further comprising a third inverter for connection between the DC bus and the traction motor whereby the third inverter is in parallel connection with the first and inverters and wherein the controller coordinates the operation of the third inverter with the first and second inverters.

3. The vehicle of claim 1 wherein the first inverter and the second inverter are balanced/matched such that the operating parameters of components of the first inverter are substantially the same as the operating parameters of components of the second inverter.

4. The vehicle of claim 1 further comprising a first impedance device between the first inverter and the traction motor and a second impedance device between the second inverter and the traction motor, said first and second impedance devices for balancing the load between the first and second inverters.

5. The vehicle of claim 4 wherein at least part of the impedance devices includes an electrical conductor connecting the traction motor to each phase of the inverter.

6. The vehicle of claim 1 wherein the traction motor operates at and below a predefined power level, wherein the first inverter is a three phase inverter having components which operate at less than the predefined power level, and wherein the second inverter is a three phase inverter having components which operate at less than the predefined power level.

7. The vehicle of claim 6 wherein the first inverter has components which operate at or at less than one half of the predefined power level, and wherein the second inverter has components which operate at or less than one half of the predefined power level.

8. The vehicle of claim 7 wherein the first inverter has components which are rated to operate at or at less than one half of the predefined power level, and wherein the second inverter has components which are rated to operate at or less than one half of the predefined power level.

9. The vehicle of claim 8 wherein the first inverter has components which are not rated to operate at or above one half of the predefined power level, and wherein the second inverter has components which are not rated to operate at above one half of the predefined power level.

10. The vehicle of claim 8 wherein the first inverter has components which are overloaded and unable to operate for an extended period of time at substantially above one half of the predefined power level, and wherein the second inverter has components which are overloaded and unable to operate for an extended period of time at substantially above one half of the predefined power level.

11. The vehicle of claim 1 wherein the controller controls the operation of the first inverter and the second inverter such that the operation of the first inverter is coordinated in time with the operation of the second inverter.

12. The vehicle of claim 1 wherein the components of the inverters include faster switches which have a shorter turn on delay and/or turn off delay and slower switches which have a longer turn on delay and/or turn off delay and wherein the controller employs a timing pattern which operates a particular slower switch before a particular faster switch when the particular switches are changing state.

13. The vehicle of claim 1 wherein the current sensors comprise sensors located between the components and the impedance device and the additional sensors are voltage sensors connected to the impedance device.

14. The vehicle of claim 1 wherein the current sensors comprise sensors located between the components and the traction motor and the additional sensors are voltage sensors connected to the impedance device.

15. The vehicle of claim 1 wherein the current sensors comprise sensors located along the connection between the components and the traction motors between the components and the traction motor and the additional sensors are voltage sensors connected to the connection between the components and the traction motors at a location between the components and the current sensors.

16. The vehicle of claim 1 wherein the current sensors comprise sensors located along the connection between the components and the traction motors between the components and the traction motor and the additional sensors are voltage sensors connected to the connection between the components and the traction motors at a location between the current sensors and the traction motor.

17. The vehicle of claim 1 wherein the delay generator is a feedback generator responsive to the delay compensation signal.

18. The vehicle of claim 1 further comprising:
a plurality of current sensors, each for sensing the current of each one of the components,
a plurality of additional sensors, each for sensing voltages and/or temperatures of each one of the components,
a delay generator responsive to the current sensors and/or the additional sensors for generating a first delay signal, and
a regulator responsive to the first delay generator and the current sensor for generating a second delay signal.

19. The vehicle of claim 18 further comprising a combiner for combining the second delay signal and a feedback delay signal into a delay compensation signal indicating a delay for each particular component.

20. The vehicle of claim 18 wherein the current sensors comprise sensors located between the components and the impedance device and the additional sensors are voltage sensors connected to the impedance device.

21. The vehicle of claim 18 wherein the current sensors comprise sensors located between the components and the traction motor and the additional sensors are voltage sensors connected to the impedance device.

22. The vehicle of claim 18 wherein the current sensors comprise sensors located along the connection between the components and the traction motors between the components and the traction motor and the additional sensors are voltage sensors connected to the connection between the components and the traction motors at a location between the components and the current sensors.

23. The vehicle of claim 18 wherein the current sensors comprise sensors located along the connection between the components and the traction motors between the components and the traction motor and the additional sensors are voltage sensors connected to the connection between the components and the traction motors at a location between the current sensors and the traction motor.

24. The vehicle of claim 1 wherein the non-highway vehicle is an off-highway dump truck vehicle.

25. The vehicle of claim 1 wherein the non-highway vehicle is a railroad locomotive.

26. The vehicle of claim 1 wherein the non-highway vehicle is an electro-motive vehicle.

* * * * *